Feb. 21, 1950

R. N. WELTMANN 2,497,919

VISCOMETER RECORDER

Filed Nov. 1, 1945

INVENTOR
RUTH N. WELTMANN

BY *Rolf J Schneider*
ATTORNEY

INVENTOR
RUTH N. WELTMANN

Feb. 21, 1950 — R. N. WELTMANN — 2,497,919
VISCOMETER RECORDER
Filed Nov. 1, 1945 — 5 Sheets-Sheet 5

INVENTOR
RUTH N. WELTMANN
BY Rolf E Schneider
ATTORNEY

Patented Feb. 21, 1950

2,497,919

UNITED STATES PATENT OFFICE 2,497,919

VISCOMETER RECORDER

Ruth N. Weltmann, Forest Hills, N. Y., assignor to Interchemical Corporation, New York, N. Y., a corporation of Ohio Application November 1, 1945, Serial No. 626,000

12 Claims. (Cl. 73—59)

This invention relates to rotational viscometers of the rotating-cup type and is directed more particularly to a recording device for such a viscometer. The present device is especially suited for recording the readings of a viscometer of the type shown in the patent to Henry Green, No. 2,365,339, issued December 19, 1944.

As indicated in the Green patent, the rotating-cup viscometer, which includes a rotatable cup containing the material whose flow characteristics are to be determined and a bob immersed in such material and suspended by a vertical torsion medium such as a wire, is particularly suited to cases requiring the measurement of the viscosity of materials of non-Newtonian behavior including thixotropic substances and plastics as well as materials of Newtonian behavior or liquids. The Green device possesses the advantage among instruments of its type of readily changeable cup-rotational speed. This feature makes practicable the construction of flow curves, which are useful for exploring the properties of the material under investigation. Thus, the behavior of the material in use can be predicted more satisfactorily than has heretofore been possible.

Plotting flow curves from visual observation of readings on such a rotational viscometer is obviously less convenient and more time-consuming than inspection of an automatically produced record and in addition lacks the precision of a well-made record. The moving portions of a rotating cup-type viscometer, particularly the torsion-suspension medium, by means of which the viscosity measurements are obtained, may not be subjected to any load, however, without impairment of the accuracy and sensitivity of the instrument.

I have devised for such a rotational viscometer, a satisfactory recorder which is simple of operation and does not in any way interfere with the accuracy of the instrument, my device yielding better and more dependable results than those that can be obtained by visual observation.

In accordance with my invention, there is provided, in association with a rotating cup-type viscometer, means to produce an energy emission. Mounted on the torsion-suspension medium of the viscometer is means for transmission of such energy emission, such means providing an energy-transmission position unique for each angular deflection of the bob. Means is also provided to position adjacent the transmission means a medium responsive to the energy transmitted thereby and adapted to produce a record of the effect of the transmitted energy thereon. Advantageously, the energy-transmission means is arranged in such a manner that a linear relation between its position and the angular deflection of the bob is provided; and the energy-responsive medium is moved in such a manner that a linear relation between the change of its position and the change of speed of rotation of the cup is provided, whereby readily interpretable flow curves of the material under investigation can be obtained.

Obviously, the recorder of my invention may take any of various forms of embodiment, several preferred forms of embodiment being described in detail hereinafter. For convenience only, these preferred forms of embodiment of my recorder will be described in detail as set up for operation with a rotating-cup viscometer of the type described in the Green patent. In the accompanying drawings.

Figure 1:
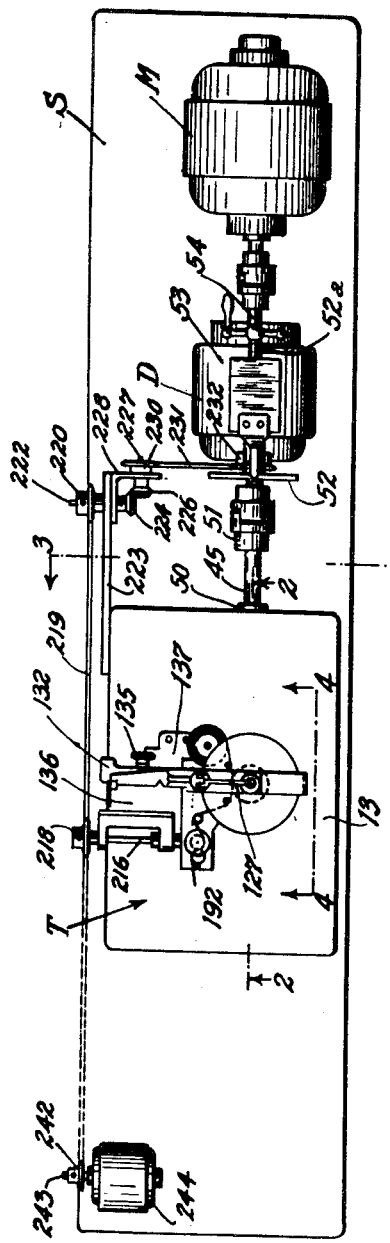
Fig. 1 is a plan view of a Green-type rotating-cup viscometer provided with my recorder.
Figure 2:
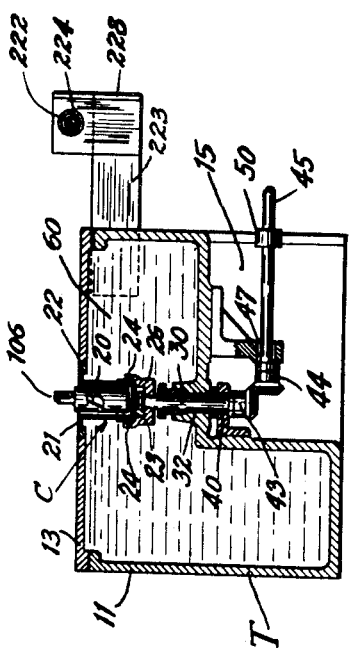
Fig. 2 is a detail vertical sectional view taken along the line 2—2 of Fig. 1.
Figure 3:
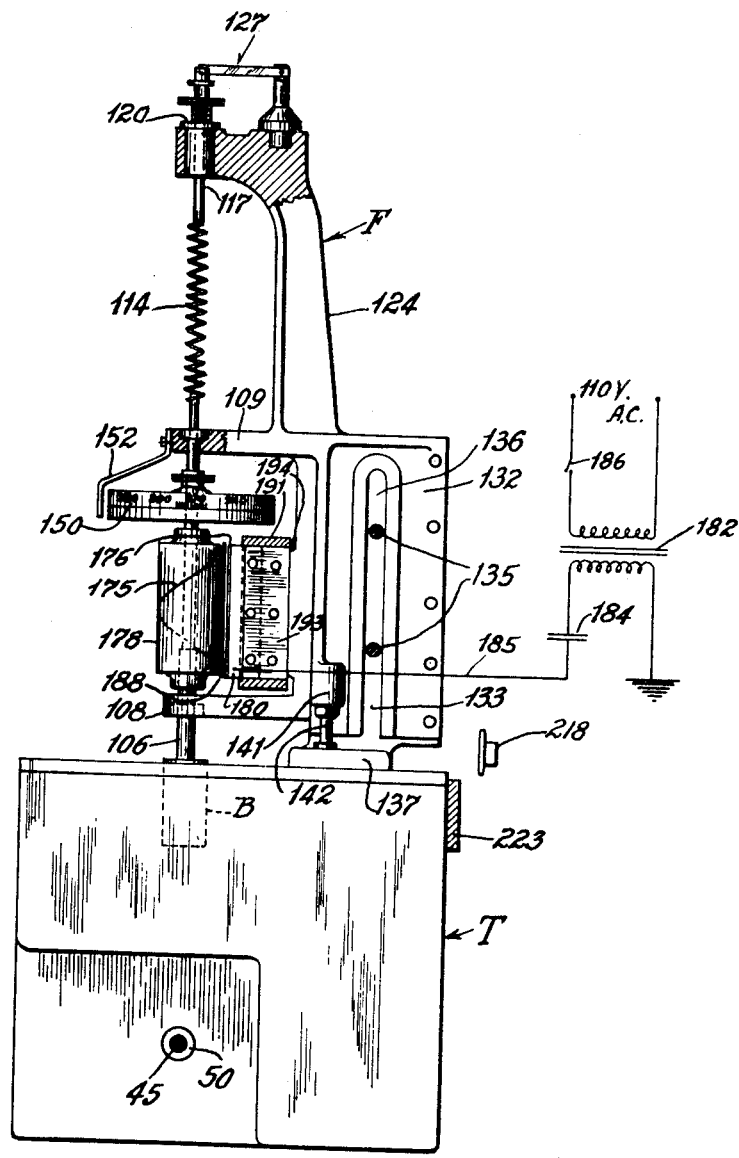
Fig. 3 is an enlarged side view, partly in section, of the viscometer and recorder taken substantially along the line 3—3 of Fig. 1.

With reference to the drawings, particularly Figs. 1 to 3, it will be observed that the viscometer comprises a constant-temperature tank T, in which is mounted a rotatable cup C driven through a variable-speed transmission drive D by a motor M. All of these parts are mounted on a suitable support S so that the entire apparatus may be easily moved. The cup C is adapted to hold a predetermined amount of the material whose flow characteristics are to be determined and to receive a bob B, which is mounted on a slidably supported holding frame F so that it may be conveniently moved into and out of the cup C before and after the viscosity measurements are made.

As shown in Fig. 2, the constant-temperature tank T comprises the housing 11 provided with the cover member 13 and a cut-away portion forming the space 15 for receiving some of the operating parts for rotating the cup C. This cup comprises the cylindrical member 20 having along its upper edge the flange 21, which is adapted to ride on the annular bearing surface 22 provided in the cover member 13. Cup C includes the bottom portion 23, which is removably seated in the cup-supporting member 26 and is locked thereto by the diametrically opposed pins 24.

Cup-supporting member 26 is mounted on the shaft 30, which is supported in the bearings 32 and 40. At its lower end, shaft 30 is provided with the bevel gear 43, which cooperates with the bevel gear 44 mounted on the drive shaft 45 supported in bearings 47 and 50. Shaft 45 is connected by coupling 51 with the variable-speed transmission drive D, which may be of any desired conventional construction. A manually operated means 53 may be provided to change the speed of rotation of shaft 45 within predetermined limits, such means including the dial 52 mounted on shaft 52a for indicating the speed in revolutions per minute on the output side of drive D. At its input side, the drive D is coupled to motor M through shaft 54.

By means of this arrangement, cup C may be driven at any desired speed within the range determined by the characteristics of the motor M and the transmission drive D, and this speed may be altered within such range. This arrangement permits the viscometer to be used in measuring the flow characteristics of a material where more than one force or speed is required so that data for the plotting of a flow curve may be obtained.

As indicated in Fig. 2, housing 11 contains a quantity of a liquid 60 in which the cup C is disposed. As is well known, the temperature of this liquid must be maintained within very narrow limits during a viscosity measurement since the viscosity of a material usually changes considerably with even a small variation in temperature. Generally it is desirable to maintain the liquid 60 at a temperature slightly above atmospheric, for it is much more practicable to add a controlled amount of heat to a liquid than to remove heat therefrom. Accordingly, suitable means (not shown) may be provided in the conventional manner to maintain the liquid 60 at the predetermined constant temperature.

The bob B comprises a cylindrical member of somewhat smaller diameter and height than the inside dimensions of the cup C and is rigidly and concentrically mounted on the lower end of shaft 106 (Fig. 3). This shaft extends vertically upward and is suitably journaled in the spaced projections 108 and 109 of the slidable frame F. The upper end of the shaft 106 is suitably connected to a torsion member 114, which may comprise a spring and which is in turn connected to supporting shaft 117 in axial alignment with shaft 106 and mounted in the upwardly projecting supporting arm 124. As will be noticed, the supporting shaft 117 is mounted in the hollow adjustable screw 120 whereby the position of the torsion member 114 can be vertically adjusted. Key 127 is provided to prevent rotation of shaft 117.

Holding frame F is slidably mounted for vertical movement above the constant-temperature tank T so that the bob B may be moved into and out of the cup C. For this purpose, frame F is provided with an elongated vertically disposed slot 133 centrally disposed in the block-shaped extension 132. Slot 133 is engaged by the thumb screws 135 threaded into openings provided in the upwardly projecting supporting arm 136, which is provided with the base portion 137 for attachment to the cover member 13. The extent of the downward position of the bob B in the cup C is regulated by means of the adjustable stop screw 142, which is threaded into lug 141 and is adapted to bear against the base portion 137.

For visual indication of the number of degrees of rotation or displacement of the bob B at any point during a viscosity-measuring operation, there may be provided the annular scale 150 conveniently removably secured to the shaft 106 just below projection 109. The pointer 152, which is fastened to projection 109, cooperates with this scale.

According to my invention, I provide a device for directly recording the deflection of the bob B during the measurement of the flow characteristics of any particular material. The specific forms of embodiment of my recorder described hereinafter consist essentially of the following elements: (1) a first electrode mounted on the bob shaft 106 and arranged to present a position unique for each deflection of the bob B; (2) a second electrode fixedly mounted adjacent the first electrode and spaced therefrom to provide a spark gap therebetween for each unique position of the first electrode; (3) means to move a spark-puncturable medium between the two electrodes in accordance with the change of speed of rotation of cup C; and (4) means to impress a high-frequency current across the electrodes to cause a spark to jump therebetween. Most advantageously, the first electrode is arranged in such a manner that a linear relation between its position and the angular deflection of the bob B is provided; and the spark-puncturable medium is moved between the electrodes in such a manner that a linear relation between the change of its position and the change of speed of rotation of cup C is provided. In this way, an easily readable flow curve can be produced.

Figure 5:
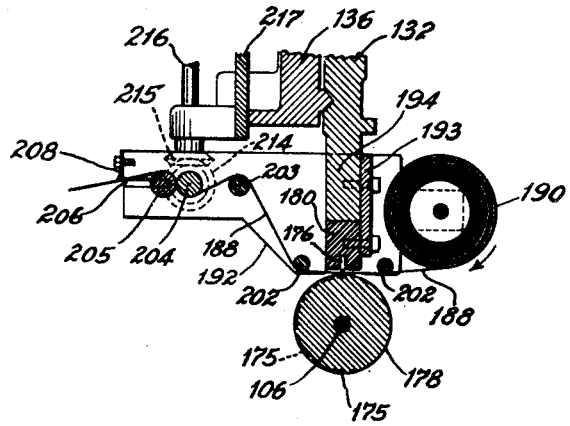
Fig. 5 is a detail horizontal view, with parts in section and parts broken away, taken along the line 5—5 of Fig. 4.
Figure 4:
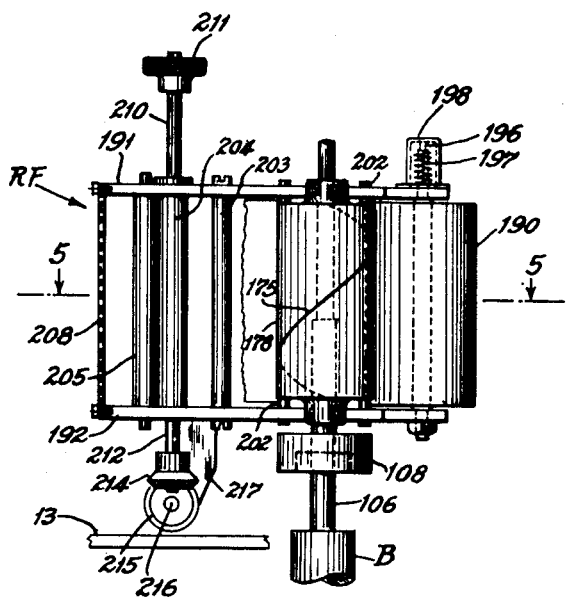
Fig. 4 is an enlarged detail elevational view, taken along the line 4—4 of Fig. 1 of the arrangement of the recorder.

In the specific form of embodiment of my invention shown in Figs. 4 and 5, the first electrode comprises the wire coil 175, and the second electrode comprises the vertical bar 176. Wire coil 175 is embedded desirably only partially, in the surface of insulating cylinder 178, which is conveniently formed of a phenol-formaldehyde resin or the like and which is securely mounted on bob shaft 106. Bar 176 is similarly embedded in the insulating block 180, which is conveniently formed of polystyrene or the like and which is secured to the slidable frame F as described hereinafter. As shown in the drawings, the two electrodes are spaced from each other a sufficient distance to provide a spark gap therebetween for each position of the wire electrode.

The bar electrode, as shown in Fig. 3, is connected to a source of high-frequency current, which consists essentially of a transformer 182 and a condenser 184 interposed in the lead 185 between bar 176 and one side of the high-voltage transformer winding. The other side of this high-voltage winding is grounded as indicated, and the low-voltage winding may be connected through switch 186 to a convenient source of alternating current as shown. The wire electrode is fastened at its ends to the bob shaft 106 and is thereby grounded through the metal frame of the viscometer. With this arrangement, when the switch 186 is closed, sparking takes place between the bar electrode and the wire electrode at the point of the latter closest to the former.

Adapted to pass through the spark gap between the two electrodes is the continuous web or sheet 188 of a spark-puncturable material such as paper, which is fed from the supply roller 190 journaled in recorder frame RF. This frame consists of upper support 191 and lower support 192 joined by the vertical web 193, which is securely fastened to extension 194 of slidable frame F. Web 193 extends beyond extension 194 a sufficient amount so that insulating block 180 can be suitably secured thereto. The shaft of supply roller 190 is provided with upper extension 196, about which spring 197 is wound. The lower end of this spring is fastened to the roller 190, and the upper end thereof is secured to the cap 198, which provides a cover for the shaft extension 196 and which may be bolted, for example, to upper support 191.

As the continuous sheet 188 is fed from the supply roller 190, it passes over guide post 202, through the spark gap, over guide post 202 and around guide post 203, and between the drive roller 204 and its companion idling roller 205. Continuous sheet 188 is preferably so positioned in the spark gap that it does not touch wire electrode 175. The several guide posts are mounted in the supports 191 and 192 and may serve as braces therefor, and the rollers 204 and 205 are journaled in supports 191 and 192. Idling roller 205 is preferably journaled in slots 206 so that its position with respect to drive roller 205 can be adjusted. In this manner the continuous sheet 188 can be frictionally gripped between rollers 204 and 205 and positively advanced by rotation of roller 204. A knife edge 208 may be provided for severing the continuous sheet 188 at any desired point.

The shaft of drive roller 204 extends above upper support 191 at 210 and is provided with knurled head 211 for manual rotation thereof. The lower end 212 of the drive-roller shaft extends below lower support 192 and is provided with the bevel gear 214. A companion bevel gear 215 is carried by shaft 216, which is so journaled in bracket 217, conveniently fastened to the supporting arm 136, that gear 215 engages gear 214 when the slidable frame F is lowered to dispose bob B within cup C. The other end of shaft 216 is provided with the sprocket 218, which is driven by the sprocket chain 219 in turn driven by the sprocket 220 mounted on the stud shatf 222 (Fig. 1).

The other end of this stud shaft, journaled in the bracket 223 securely fastened to the housing 11 of the constant-temperature tank T, carries the bevel gear 224, which is engaged by its companion bevel gear 226 mounted on stud shaft 227 journaled in extension 228 of bracket 223. Sprocket 230 is carried on the other end of stud shaft 227 and is driven by the sprocket chain 231, which is in turn driven by the sprocket 232 mounted on shaft 52a immediately behind the dial 52 of speed-changing means 53.

On operation of the viscometer provided with my recorder, the material whose flow characteristics are to be determined is placed in cup C, and slidable frame F is adjusted to lower bob B into position in cup C. The continuous sheet material 188 is inserted through the spark gap and between the drive roller 204 and the idling roller 205 and is adjusted into the proper position by manual rotation of the drive roller. Motor M is then started; and speed-changing means 53 is adjusted to the speed of rotation desired for cup C, switch 186 having in the meantime been closed. A spark is produced across the spark gap; and a mark, which appears as a pinhole or a scorch if the continuous puncturable medium 188 comprises paper, is produced thereon.

This operation is then repeated at different speeds of rotation of cup C in order to obtain additional deflection readings. In such case, however, the relation between the change of speed of rotation of cup C (expressed as revolutions per minute, for example) and the change of position of the continuous medium 188 should be linear; i. e., for a given increase or decrease in the speed of rotation of cup C (say, 10 R. P. M.), the continuous medium should move a given distance (say, 1 cm.); and the relation between the shape or position of the wire electrode 175 and the angular deflection of the bob B should be linear so that the resulting graph representing the series of marks made by the spark can be readily read and interpreted. To provide this linear relation, wire electrode 175 is formed in the shape of a simple helix (i. e., if the surface of insulating cylinder 178 were to be flattened, the wire electrode would appear as a straight line thereon). Generally one complete turn is sufficient to provide a graph of satisfactory scope; and the ends of the complete turn are conveniently located adjacent the bar electrode 176 at zero deflection of the bob, the bar electrode extending slightly above and below insulating cylinder 178.

Figure 6:
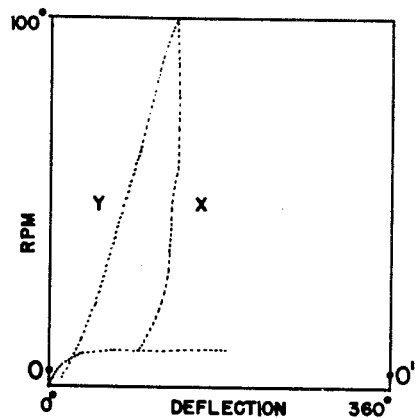
Fig. 6 is a typical flow curve obtained with my recorder.

In the determination of the flow characteristics of a material, it is generally desirable to record the deflections of bob B as the speed of rotation of cup C is gradually increased from zero to a maximum and gradually decreased from the maximum to zero so that a graph similar to that shown in Fig. 6 for a typical thixotropic material is obtained. With the apparatus arrangement described above, in such case curve X is produced as the speed of rotation of cup C is increased, the sheet 188 moving from right to left, as viewed in Fig. 4, during this time. To obtain the curve Y, which is produced as the speed of rotation of cup C is decreased, speed-changing means 53 is rotated in the opposite direction; and sheet 188 is thereby moved from left to right, as viewed in Fig. 4, spring 197 insuring that the sheet, which is still frictionally gripped by drive roller 204 and idling roller 205, is rewound during this operation.

Figure 8:
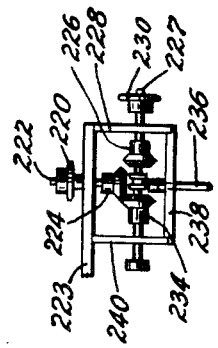
Fig. 8 is a modified arrangement of a portion of the apparatus shown in Fig. 1.
Figure 7:
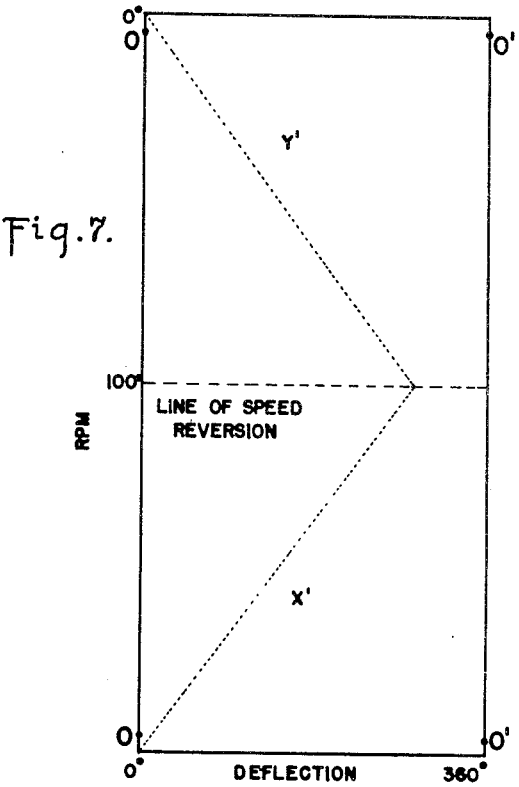
Fig. 7 is another type of typical flow curve obtained with my recorder.

The flow curves may also be obtained in the form of curves X' and Y' as shown in Fig. 7 for a typical liquid, curve X' being produced as the speed of rotation of cup C is gradually increased and curve Y' being produced as the speed of rotation of cup C is gradually decreased. In such case, the continuous sheet 188 moves in the same direction as both curves are being produced, and the gear box 236 shown in Fig. 8 must be provided. During the production of curve X', bevel gear 204 is engaged by bevel gear 226. When the speed of rotation of cup C is decreased to produce curve Y', however, bevel gear 224 is engaged by bevel gear 234, which is brought into engagement with the former by shifting of common shaft 227 to the right (as viewed in Fig. 8) by movement of the lever 236. This lever may be mounted on bracket 238, which may be secured to the housing 11. Common shaft 227 is journaled in bracket extension 228 and bracket 240 fastened to brackets 223 and 238.

The recorder may be conveniently calibrated by preparing a master coordinate system in which one axis represents revolutions per minute (cup speed) and the other axis represents degrees of bob rotation (angular deflection). This master coordinate system may be prepared by producing marks on a continuous sheet of paper at equal increments of speed of rotation and at equal increments of angular deflection, drawing vertical and horizontal lines on the paper through these marks, and transferring the resulting coordinated lines to a glass plate. The sheet medium containing the flow curve obtained in any particular determination can then be placed in position with respect to the glass plate and read directly therefrom. Before a flow curve is produced, the two zero points o and o' are marked on the sheet medium so that the curve may be properly positioned with respect to the master coordinate system.

Figure 9:
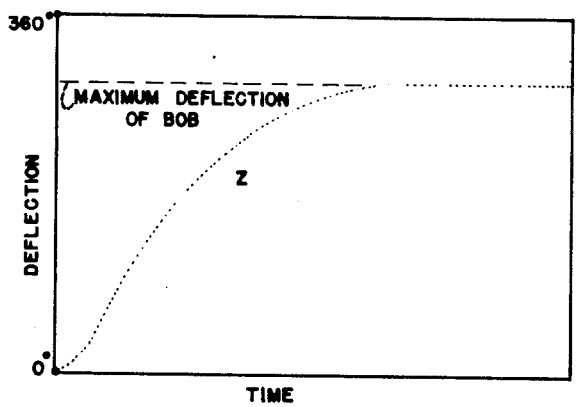
Fig. 9 is a typical time-deflection curve obtained with my recorder.

In the event that it is desired to obtain only a time-deflection curve as shown by curve Z in Fig. 9 for a typical liquid, then the sprocket chain 219 is disengaged from sprocket 220 and is engaged on sprocket 242 mounted on shaft 243 driven by motor 244 (dotted-line arrangement shown in Fig. 1). In this type of flow-characteristic determination, the continuous sheet material 188 is advanced at a constant speed, and cup C is rotated at a constant speed. Motor 244 is desirably of such type and construction that its speed may be changed whereby either the speed of travel of sheet 188 or the speed of rotation of cup C may be varied.

Figure 11:
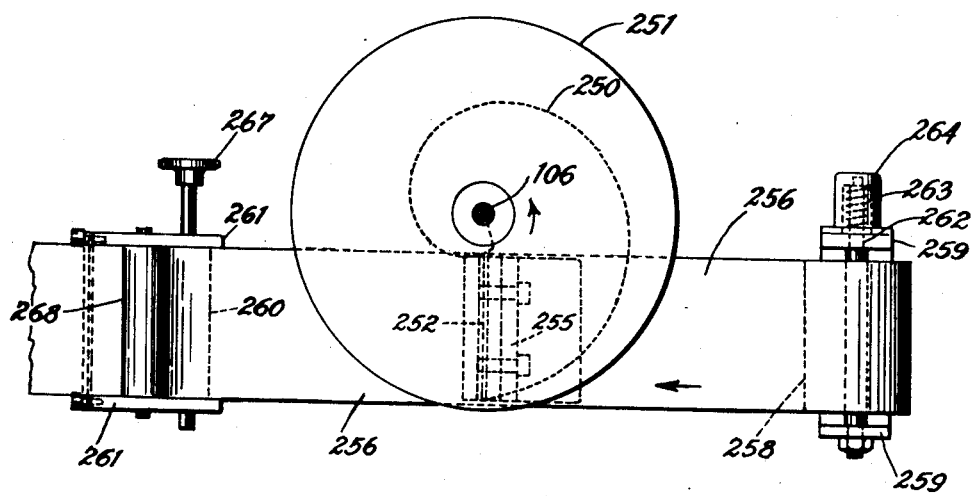
Fig. 11 is a plan view of the modified recorder shown in Fig. 10.
Figure 10:
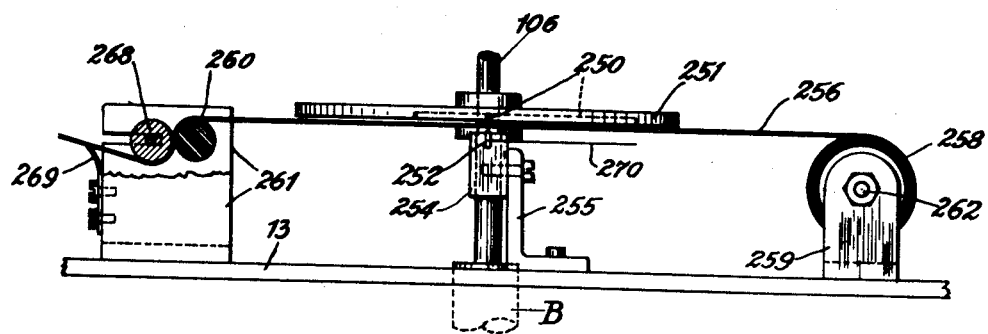
Fig. 10 is an enlarged elevational view of a modified form of embodiment of the recorder shown in Figs. 3, 4 and 5.

A modified specific form of embodiment of my invention is shown in Figs. 10 and 11. In this case the wire electrode 250 is embedded desirably only partially, in the horizontal surface of insulating disc 251, which is mounted on bob shaft 106. Preferably, so that a readily interpretable graph can be produced, wire electrode 250 is arranged in the form of an Archimedes spiral, which provides a linear relation between the shape or position of this electrode and the angular deflection of bob B. Bar electrode 252 is embedded in the insulating block 254 mounted on the bracket 255 secured to tank cover 13.

As with the helical wire electrode 175, the spiral wire electrode 250 is conveniently arranged in one complete turn with its ends located adjacent the bar electrode 252 at zero deflection of the bob; and the bar electrode 252 extends slightly beyond the width of the spiral in which the wire electrode is shaped. These electrodes are similarly spaced to provide a spark gap through which the puncturable sheet medium 256 can be moved without contact with the spiral electrode.

Continuous sheet 256 is fed from supply roller 258, journaled in brackets 259, through the spark gap and onto the drive roller 260, which is journaled in brackets 261. Shaft 262 of supply roller 258 may be provided with the spring 263 attached at one end to the shaft and at the other end to cover 264 secured to one of the brackets 259. Shaft 266 of drive roller 260 is provided at its end with the sprocket 267, which is engaged by sprocket chain 219 for driving thereof. An idling roller 268 adjustably mounted in brackets 261 is provided adjacent drive roller 260 so that the sheet 256 can be frictionally gripped therebetween. Sheet 256 may be severed as desired by means of knife edge 269.

Wire electrode 250 is connected at its ends to bob shaft 106 and is thereby grounded. Bar electrode 252 is connected by lead 270 to a source of high-frequency current (not shown), one side of which is grounded.

In place of paper, any other suitable material may be employed as the continuous puncturable sheet medium. For example, a suitable backing material containing a thin coating of a hot-melt composition, which melts in dots on the application of the spark thereto, may be used for this purpose.

If desired, means such as a reversible motor (not shown) may be connected to shaft 52a of speed-changing means 53 in place of the manual control shown in Fig. 1.

It will be obvious from the above that my automatic recording device is so arranged and constructed that none of its elements interferes in any way with the bob-suspension medium of a rotational viscometer.

I claim:

1. A recording device for use in connection with a rotational viscometer, said viscometer including a cup to contain a material whose flow characteristics are to be determined, means to rotate said cup, means to change the speed of rotation of said cup, a bob adapted to be centrally positioned within said cup, and a torsion-suspension means for said bob, which device comprises means to produce an energy emission, means mounted on said torsion-suspension means for transmission of said energy emission, said means providing an energy-transmission position unique for each deflection of the bob, and means to move a continuous medium adjacent said transmission means, in accordance with the change in speed of rotation of the cup, said continuous medium being responsive to the energy transmitted by said transmission means and producing a record of the effect of said energy thereon.

2. A recording device for use in connection with a rotational viscometer, said viscometer including a cup to contain a material whose flow characteristics are to be determined, means to rotate said cup, means to change the speed of rotation of said cup, a bob adapted to be centrally positioned within said cup, and a torsion-suspension means for said bob, which device comprises means to produce an energy emission, means mounted on said torsion-suspension means for transmission of said energy emission, said means providing an energy transmission position unique for each deflection of the bob and being arranged to provide a linear relation between its position and the angular deflection of the bob, and means to move a continuous medium adjacent said transmission means in a manner to provide a linear relation between the change of its position and the change of speed of rotation of the cup, said continuous medium being responsive to the energy transmitted by said transmission means and producing a record of the effect of said energy thereon.

3. A recording device for use in connection with a rotational viscometer, said viscometer including a cup to contain a material whose flow characteristics are to be determined, means to rotate said cup, means to change the speed of rotation of said cup, a bob adapted to be centrally positioned within said cup, and a torsion-suspension means for said bob, which device comprises an electrode mounted on said torsion-suspension means in a manner to provide a position unique for each deflection of the bob, a second electrode fixedly mounted adjacent said first electrode to provide a spark gap therebetween for each unique position of said first electrode, means to move a continuous spark-puncturable medium between said two electrodes in accordance with the change in speed of rotation of the cup, and means to impress a high-frequency current across said electrodes to cause a spark to jump therebetween and to puncture said medium.

4. A recording device for use in connection with a rotational viscometer, said viscometer including a cup to contain a material whose flow characteristics are to be determined, means to rotate said cup, means to change the speed of rotation of said cup, a bob adapted to be centrally positioned within said cup, and a torsion-suspension means for said bob, which device comprises an electrode mounted on said torsion-suspension means, a second electrode fixedly mounted adjacent said first electrode to provide a spark gap therebetween for each position of said first electrode said first electrode being mounted in the shape of a helix to provide a linear relation between its position and the angular deflection of the bob, means to move a continuous spark-puncturable medium between said two electrodes in a manner to provide a linear relation between the change of its position and the change of speed of rotation of said cup, and means to impress a high-frequency current across said electrodes to cause a spark to jump therebetween and to puncture said medium.

5. A recording device for use in connection with a rotational viscometer, said viscometer including a cup to contain material whose flow characteristics are to be determined, means to rotate said cup, means to change the speed of rotation of said cup, a bob adapted to be centrally positioned within said cup, and a torsion-suspension means for said bob, which device comprises an electrode mounted on said torsion-suspension means, a second electrode fixedly mounted adjacent said first electrode to provide a spark gap therebetween for each position of said first electrode said first electrode being mounted in the shape of a helix to provide a linear relation between its position and the angular deflection of the bob, means to move a continuous spark-puncturable medium between said two electrodes in a manner to provide a linear relation between the change of its position and the change of speed of rotation of said cup, said moving means including means to move said medium in one direction as the speed of rotation of said cup is increased and means to move said medium in the opposite direction as the speed of rotation of said cup is decreased, and means to impress a high-frequency current across said electrodes to cause a spark to jump therebetween and to puncture said medium.

6. A recording device for use in connection with a rotational viscometer, said viscometer including a cup to contain a material whose flow characteristics are to be determined, means to rotate said cup, means to change the speed of rotation of said cup, a bob adapted to be centrally positioned within said cup, and a torsion-suspension means for said bob, which device comprises an electrode mounted on said torsion-suspension means in the form of a simple helix, a bar electrode fixedly mounted adjacent said helical electrode to provide a spark gap therebetween for each position of said helical electrode, means to move a continuous spark-puncturable medium between said two electrodes in accordance with the change in speed of rotation of the cup, and means to impress a high-frequency current across said electrodes to cause a spark to jump therebetween and to puncture said medium.

7. A recording device for use in connection with a rotational viscometer, said viscometer including a cup to contain a material whose flow characteristics are to be determined, means to rotate said cup, means to change the speed of rotation of said cup, a bob adapted to be centrally positioned within said cup, and a vertical torsion-suspension means for said bob, which device comprises an insulating cylinder mounted on said torsion-suspension means, a wire electrode in the form of a simple helix embedded in the surface of said cylinder, an insulating block fixedly mounted adjacent said cylinder, a vertical bar electrode embedded in said block and providing a spark gap with said wire electrode for each position thereof, means to move a continuous spark-puncturable medium between said two electrodes in a manner to provide a linear relation between the change of its position and the change of speed of rotation of the cup, and means to impress a high-frequency current across said electrodes to cause a spark to jump therebetween and to puncture said medium.

8. A recording device for use in connection with a rotational viscometer, said viscometer including a cup to contain a material whose flow characteristics are to be determined, means to rotate said cup, means to change the speed of rotation of said cup, a bob adapted to be centrally positioned within said cup, and a torsion-suspension means for said bob, which device comprises an electrode mounted on said torsion-suspension means in the form of an Archimedes spiral, a bar electrode fixedly mounted adjacent said spiral electrode to provide a spark gap therebetween for each position of said spiral electrode, means to move a continuous spark-puncturable medium between said two electrodes in accordance with the change in speed of rotation of the cup, and means to impress a high-frequency current across said electrodes to cause a spark to jump therebetween and to puncture said medium.

9. A recording device for use in connection with a rotational viscometer, said viscometer including a cup to contain a material whose flow characteristics are to be determined, means to rotate said cup, means to change the speed of rotation of said cup, a bob adapted to be centrally positioned within said cup, and a vertical torsion-suspension means for said bob, which device comprises an insulating disc mounted on said torsion-suspension means, an insulating block fixedly mounted adjacent said disc, a wire electrode in the form of an Archimedes spiral embedded in one of the horizontal surfaces of said disc and facing said lock, a horizontal bar electrode embedded in said block and providing a spark gap with said spiral electrode for each position thereof, means to move a continuous spark-puncturable medium between said two electrodes in a manner to provide a linear relation between the change of its position and the change of speed of rotation of the cup, and means to impress a high-frequency current across said electrodes to cause a spark to jump therebetween and to puncture said medium.

10. A viscometer of the rotating-cup type comprising a shaft, a cup mounted thereon, driving means, a variable-speed drive interconnecting said driving means to said shaft, means for varying the ratio of said drive, a bob adapted to be centrally positioned within said cup, a torsion-suspension means for said bob, means mounted on and cooperating with said torsion-suspension means for measuring the angular deflection of the bob, means to record the measurement of such angular deflection on a continuous medium, and means to move said continuous medium in accordance with the change in speed of rotation of the cup.

11. A viscometer of the rotating-cup type comprising a shaft, a cup mounted thereon, driving means, a variable-speed drive interconnecting said driving means to said shaft, means for varying the ratio of said drive, a bob adapted to be centrally positioned within said cup, a torsion-suspension means for said bob, means mounted on and cooperating with said torsion-suspension means for measuring the angular deflection of the bob, means to record the measurement of such angular deflection on a continuous medium, and means to move said continuous medium in a manner to provide a linear relation between the change of its position and the change in speed of rotation of the cup.

12. A viscometer of the rotating-cup type comprising a shaft, a cup mounted thereon, driving means, a variable-speed drive interconnecting said driving means to said shaft, means for varying the ratio of said drive, a bob adapted to be centrally positioned within said cup, a torsion-suspension means for said bob, means mounted on and cooperating with said torsion-suspension means for measuring the angular deflection of the bob, means to record the measurement of such angular deflection on a continuous medium, and means to move said continuous medium in a manner to provide a linear relation between the change of its position and the change in speed of rotation of the cup, said moving means including means to move said medium in one direction as the speed of rotation of said cup is increased and means to move said medium in the opposite direction as the speed of rotation of said cup is decreased.

RUTH N. WELTMANN.

REFERENCES CITED

The following references are of record in the file of this patent:

UNITED STATES PATENTS

| Number | Name | Date |
|---|---|---|
| 533,902 | Jaeger | Feb. 12, 1895 |
| 620,327 | Jaeger | Feb. 28, 1899 |
| 1,278,964 | MacGill | Sept. 17, 1918 |
| 2,365,339 | Green | Dec. 19, 1944 |
| 2,382,979 | Demb | Aug. 21, 1945 |
| 2,410,385 | Loukomsky et al. | Oct. 29, 1946 |